(12) United States Patent
Li et al.

(10) Patent No.: US 8,300,990 B2
(45) Date of Patent: Oct. 30, 2012

(54) SLOTTED OPTICAL WAVEGUIDE WITH ELECTRO-OPTIC MATERIAL

(75) Inventors: Guoliang Li, San Diego, CA (US); Jin Yao, San Diego, CA (US); Ashok V. Krishnamoorthy, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 288 days.

(21) Appl. No.: 12/759,964

(22) Filed: Apr. 14, 2010

(65) Prior Publication Data
US 2011/0255823 A1    Oct. 20, 2011

(51) Int. Cl.
*G02F 1/035* (2006.01)
(52) U.S. Cl. .......... 385/2; 385/1; 385/14; 385/131; 359/245
(58) Field of Classification Search .............. None
See application file for complete search history.

(56) References Cited

U.S. PATENT DOCUMENTS

| | | | |
|---|---|---|---|
| 6,845,198 B2* | 1/2005 | Montgomery et al. | 385/50 |
| 7,454,102 B2* | 11/2008 | Keyser et al. | 385/36 |
| 7,606,455 B2* | 10/2009 | Barrios et al. | 385/131 |
| 7,657,130 B2* | 2/2010 | Shastri et al. | 385/2 |
| 2005/0189591 A1* | 9/2005 | Gothoskar et al. | 257/347 |
| 2011/0058764 A1* | 3/2011 | Kim et al. | 385/2 |
| 2012/0033910 A1* | 2/2012 | Morini et al. | 385/3 |

* cited by examiner

*Primary Examiner* — Hemang Sanghavi
(74) *Attorney, Agent, or Firm* — Park, Vaughan, Fleming & Dowler LLP; Steven E. Stupp (57) ABSTRACT

An optical waveguide is described. This optical waveguide may be defined in a semiconductor layer, and may include a vertical slot that includes an electro-optic material having an electric-field-dependent index of refraction, and the electro-optic material may be other than a semiconductor in the semiconductor layer. Alternatively, the optical waveguide may include a vertical stack with two semiconductor layers that surround and partially overlap an intermediate layer, which includes the electro-optic material.

14 Claims, 11 Drawing Sheets

SLOTTED OPTICAL WAVEGUIDE WITH ELECTRO-OPTIC MATERIAL

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

BACKGROUND

1. Field

The present disclosure relates to techniques for communicating optical signals. More specifically, the present disclosure relates to an optical waveguide that contains a vertical or a horizontal slot which includes an electro-optic material.

2. Related Art

Silicon photonics is a promising technology that can provide the large communication bandwidth and low power consumption needed to facilitate inter- and intra-chip interconnections. For example, a point-to-point communication network can be established using silicon-photonic devices and links to interconnect a large number of processor cores in a manner that achieves scalable performance with affordable manufacturing and energy costs. In addition, silicon photonics can be compatible with CMOS processing, which facilitates high-yield, low-cost integration with other devices and circuits.

One of the building blocks in inter- and intra-chip silicon-photonic interconnects is an optical modulator. An optical modulator converts an electrical data signal into an optical signal. Typically, an optical modulator provides: high speed (for example, in excess of 10 Gb/s), low power consumption, low optical loss, a high ON/OFF extinction ratio and compact size.

Many existing silicon-based optical modulators operate based on the free-carrier plasma-dispersion effect in silicon. In particular, the index of refraction of silicon decreases as the densities of electrons and holes (i.e., free carriers) increase. In order to use this effect for data modulation, carrier densities in an optical waveguide in a silicon-based optical modulator are typically electrically modulated, thereby changing the index of refraction and, thus, the phase of light propagating in the optical waveguide. This phase modulation is converted into an optical intensity modulation (i.e., ON/OFF switching) by including the phase-modulation optical waveguide in a Mach-Zehnder interferometer (MZI) or a ring resonator.

However, there are some problems with existing silicon-based optical modulators. In particular, the dependence of the index of refraction of silicon on the free-carrier density is weak. It is also associated with optical loss, and there is typically a relatively small overlap between the optical mode and a carrier-swept region in existing silicon-based optical modulators. As a consequence, when modulating the free-carrier density using carrier injection or carrier depletion, the size of a silicon-based optical modulator typically needs to be approximately one millimeter to generate a 180° phase shift in an MZI-type optical modulator.

By using forward-bias operation of a PIN diode to inject carriers, there can be a larger overlap region (relative to carrier-depletion operation) and, thus, a larger modulation of the index of refraction and the phase. However, the modulation speed is limited by the carrier diffusion velocity (which is on the order of a nanosecond). A modulation speed of 12.5 Gb/s has been achieved, but only by utilizing a pre-emphasized electrical signal (with Vpp equal to 8 V plus a 3.5 V pre-emphasized pulse), which significantly increased the power consumption. While carrier-depletion operation in a reverse-biased PIN diode is not affected by such a speed limit, it typically uses a higher voltage and/or a longer modulation length (for example, more than 2 V-cm) in order to obtain a 180° phase shift in an MZI-type optical modulator.

In addition, the power consumption associated with large MZI-type optical modulators often makes these components impractical in optical-interconnect applications (such as in high-performance computing systems). While a compact resonator (such as a micro-ring or a micro-disk that is smaller than hundreds of micrometers) with a small capacitance can be used, this type of optical modulator usually needs to be tuned in order to align its resonant wavelength with a carrier wavelength (such as a laser wavelength) in an optical interconnect because of the sensitivity to unwanted phase shifts associated with: environment temperature, fabrication variations, and modulation-bias condition and fluctuation. Furthermore, while carrier-injection tuning is efficient, it often introduces optical loss, which can significantly degrade the quality (Q) factor of a resonator. However, the alternative approach, thermal tuning, generally consumes too much power, and this problem is expected to become even more challenging as the critical dimensions of optical modulators are scaled to smaller values.

Hence, what is needed is an optical modulator without the above-described problems.

SUMMARY

One embodiment of the present disclosure provides an integrated circuit that includes an optical waveguide. This optical waveguide includes a first semiconductor layer and an intermediate layer disposed over a portion of the first semiconductor layer. The intermediate layer includes an electro-optic material having an electric-field-dependent index of refraction, and the electro-optic material differs from a semiconductor in the semiconductor layer. Furthermore, the optical waveguide includes a second semiconductor layer disposed over the intermediate layer, which substantially overlaps the portion of the first semiconductor layer.

Note that the intermediate layer may have a width, thereby defining a width of the optical waveguide.

In some embodiments, the integrated circuit includes a first electrode defined in the first semiconductor layer, and a second electrode defined in the second semiconductor layer. The first electrode and the second electrode may be proximate and adjacent to the overlap between the first semiconductor layer, the intermediate layer and the second semiconductor layer. Furthermore, the first electrode and the second electrode may facilitate electro-optic modulation of the index of refraction in the intermediate layer.

In some embodiments, the optical waveguide is included in a ring resonator, and the first electrode and the second electrode facilitate electro-optic modulation of the index of refraction in the ring resonator without adversely impacting a quality factor of the ring resonator. For example, the first electrode may surround a majority of an inner circumference of the ring resonator and the second electrode may surround a majority of an outer circumference of the ring resonator. Additionally, the integrated circuit may include a bus optical waveguide proximate to a side of the ring resonator, and the first electrode and the second electrode may be excluded from the inner circumference and the outer circumference proximate to the side, thereby avoiding an adverse impact on optical coupling between the ring resonator and the bus optical waveguide.

Another embodiment provides a method for fabricating the optical waveguide. During this method, the first semiconductor layer is deposited. Then, the intermediate layer is defined over the portion of the first semiconductor layer, where the intermediate layer includes the electro-optic material having the electric-field-dependent index of refraction, and the electro-optic material differs from the semiconductor in the first semiconductor layer. Next, the second semiconductor layer is defined over the intermediate layer so that it substantially overlaps the portion of the first semiconductor layer.

Another embodiment provides another integrated circuit that includes a ridge optical waveguide, having a height and a width, which is defined in a semiconductor layer. Note that the height exceeds a thickness of the semiconductor layer adjacent and proximate to the ridge optical waveguide, and the ridge optical waveguide includes a vertical slot approximately in the middle of the width and extending over the height. Furthermore, an electro-optic material, disposed in the vertical slot, has the electric-field-dependent index of refraction, and the electro-optic material differs from a semiconductor in the semiconductor layer.

Furthermore, the other integrated circuit may include a first electrode and a second electrode that are defined in the semiconductor layer, and which are adjacent and proximate to a corresponding first side and a second side of the ridge optical waveguide, thereby facilitating electro-optic modulation of the index of refraction in the ridge optical waveguide. For example, the ridge optical waveguide may be included in a ring resonator, and the first electrode and the second electrode may facilitate electro-optic modulation of the index of refraction in the ring resonator without adversely impacting a quality factor of the ring resonator. Additionally, the first electrode may surround a majority of an inner circumference of the ring resonator, and the second electrode may surround a majority of an outer circumference of the ring resonator.

In some embodiments, the other integrated circuit includes a bus ridge waveguide proximate to a side of the ring resonator, and the first electrode and the second electrode are excluded from the inner circumference and the outer circumference proximate to the side, thereby avoiding an adverse impact on optical coupling between the ring resonator and the bus ridge waveguide.

Note that the electro-optic material may include an electro-optic polymer or a ferroelectric material. In addition, the semiconductor layer(s) may include silicon. In some embodiments, the integrated circuit and/or the other integrated circuit includes a substrate, and a buried-oxide layer disposed on the substrate, where the semiconductor layer is disposed on the buried-oxide layer. The substrate, the buried-oxide layer and the semiconductor layer may constitute a silicon-on-insulator technology.

Another embodiment provides a method for fabricating the ridge optical waveguide. During this method, the semiconductor layer is deposited, and the width of the ridge optical waveguide is defined in the semiconductor layer. Then, the vertical slot, which is approximately in the middle of the width and which extends over the height of the ridge optical waveguide, is defined. Next, the electro-optic material, which has the electric-field-dependent index of refraction, and which differs from the semiconductor in the semiconductor layer, is disposed in the vertical slot.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an optical waveguide, an optical device that includes the optical waveguide, a system that includes the optical device, and a technique for fabricating the optical waveguide are described. This optical waveguide may be defined in a semiconductor layer, and may include a vertical slot that includes an electro-optic material having an electric-field-dependent index of refraction, and the electro-optic material may be other than a semiconductor in the semiconductor layer. Alternatively, the optical waveguide may include a vertical stack with two semiconductor layers that surround and partially overlap an intermediate layer, which includes the electro-optic material.

These embodiments of the optical waveguide may be used in a high performance optical modulator (as well as in other optical components), which has low power consumption, low optical loss and compact size, while using a low-cost and high-yield manufacturing process. In particular, the optical modulator may have zero power consumption, which may facilitate systems that use dense wavelength division multiplexing (DWDM) with a channel spacing of approximately 50 GHz, as well as high-performance computing systems that include optical interconnects. Moreover, in these systems the optical modulator may: reduce the number of components, reduce the cost, and/or increase reliability.

We now describe embodiments of the optical waveguide and the optical device. An optical waveguide usually consists of a core material with a higher index of refraction and a surrounding material or cladding with a lower index of refraction so that an optical mode of the optical waveguide can be confined around the waveguide core.

An electro-optic material can be used in the waveguide core with a lower index of refraction material as the cladding. However, because the contrast in the index of refractions is small (approximately 0.1) in the active range of wavelengths of the optical waveguide, confinement of the optical mode may be poor, and the optical overlap with the electro-optic material may be small. Consequently, when such optical waveguides are used in an optical modulator, the optical modulator often needs to be very large in order to achieve sufficient modulation.

In the discussion that follows, slotted optical waveguides (either in a horizontal or a vertical direction) are described. These optical waveguides combine a highly efficient electro-optic material with a compact optical mode due to the high contrast in the index of refraction (approximately 3). When used in optical modulators, these slotted optical waveguides offer high efficiency, low power consumption and compact size.

Figure 1:
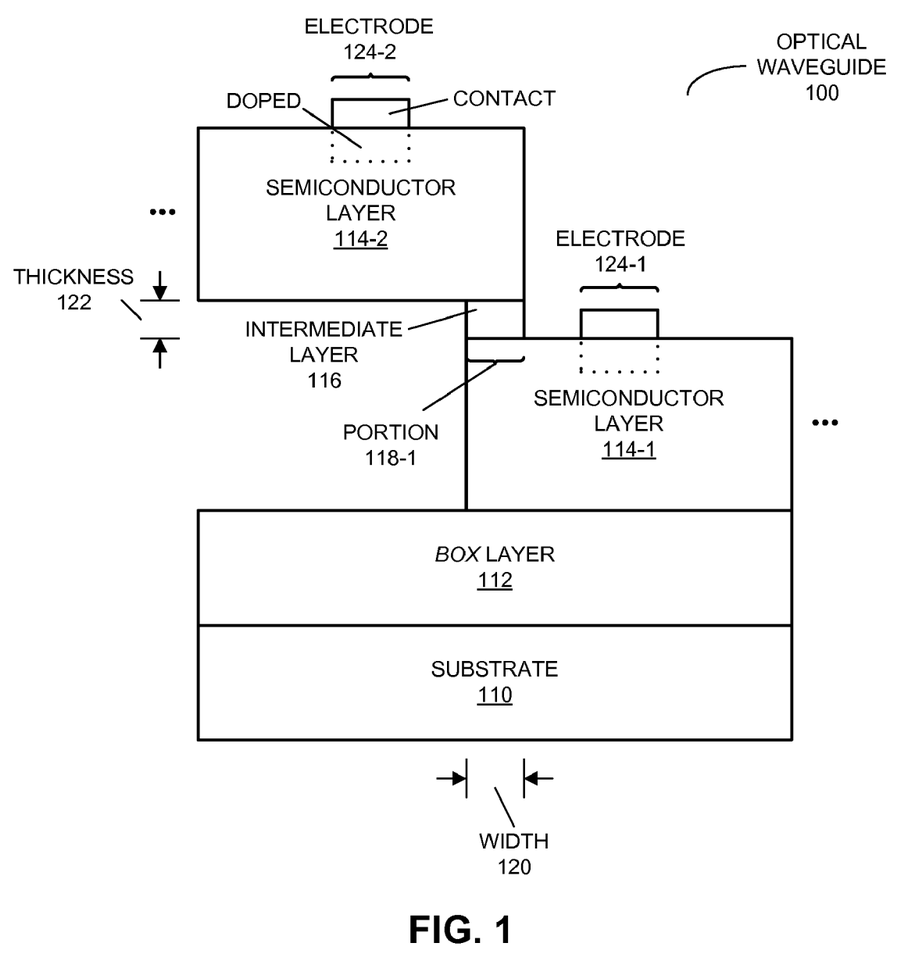
FIG. 1 is a block diagram illustrating a cross-sectional view of an optical waveguide in accordance with an embodiment of the present disclosure.
Figure 2:
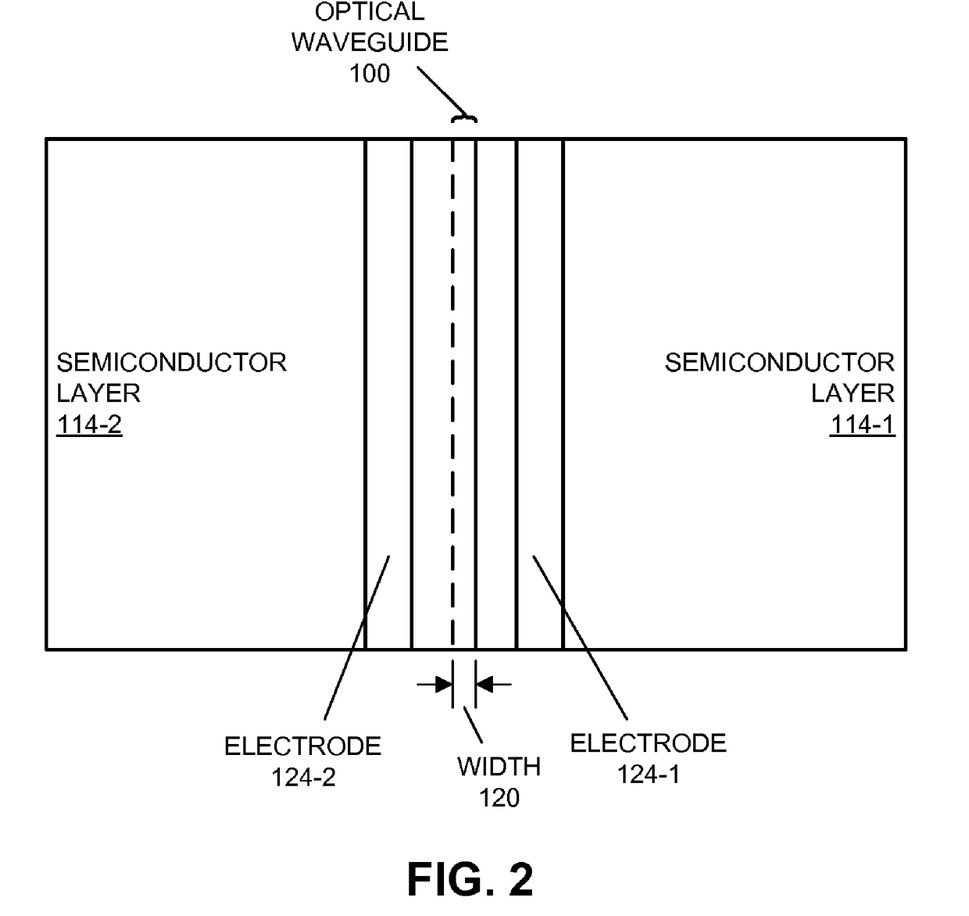
FIG. 2 is a block diagram illustrating a top view of the optical waveguide of FIG. 1 in accordance with an embodiment of the present disclosure.

FIG. 1 presents a block diagram illustrating a cross-sectional view of an optical waveguide 100 (which may be included in an integrated circuit), and FIG. 2 presents a block diagram illustrating a top view of optical waveguide 100. This optical waveguide includes a semiconductor layer 114-1 and an intermediate layer 116 disposed over a portion 118-1 of semiconductor layer 114-1. Intermediate layer 116 includes an electro-optic material having an electric-field-dependent index of refraction, and the electro-optic material differs from a semiconductor in semiconductor layer 114-1. For example, the electro-optic material may include an electro-optic polymer and/or a ferroelectric material. Furthermore, optical waveguide 100 includes a semiconductor layer 114-2 disposed over intermediate layer 116, which substantially overlaps portion 118-1 of semiconductor layer 114-1, thereby defining a horizontal slot. Note that intermediate layer 116 may have a width 120 (thereby defining a width of optical waveguide 100) and a thickness 122. In an exemplary embodiment, width 120 is between 0.5 and 5 µm.

When thickness 122 is between 100 and 500 nm, a large portion of the transverse magnetic (TM) optical mode may be confined in the horizontal slot. Furthermore, a high-speed electrical field (associated with a modulation bias) can be applied across the horizontal slot to modulate the index of refraction of the electro-optic material. Because materials with an extremely high electro-optic coefficient (up to 300-500 pm/V) can be used in this structure, it is possible to achieve very high modulation efficiency. For example, the modulation efficiency may be up to 10× larger than that of the plasma-dispersion effect during carrier-depletion operation. In addition, because electro-optic effects (such as the Pockels effect) are linear, the modulation bias (such as a DC voltage) can be applied to optical waveguide 100 to tune the resonant wavelength with zero current. Therefore, the power consumption associated with tuning of optical waveguide 100 may be zero. Moreover, the desired electric field used to modulate the index of refraction by more than $2 \times 10^{-3}$ may be 1 V per 100 nm of electro-optic-material thickness, which corresponds to a voltage of 1-5 V for thickness 122 between 100 and 500 nm.

Note that the modulation bias for optical waveguide 100 (which facilitates the aforementioned electro-optic modulation of the index of refraction in intermediate layer 116) may be provided by highly doped, low-resistance electrical contacts or terminals. In particular, electrode 124-1 may be defined by doping semiconductor layer 114-1 (or by using another high index of refraction conductive material) and electrode 124-2 may be defined by doping semiconductor layer 114-2 (or by using another high index of refraction conductive material). These electrodes may be proximate and adjacent to the overlap between semiconductor layer 114-1, intermediate layer 116 and semiconductor layer 114-2. However, electrodes 124 may be a sufficient distance from the horizontal slot that they do not introduce additional optical loss. Thus, this configuration may allow the modulation bias to be applied to semiconductor layers 114 without causing waveguide discontinuity and the series resistance may be small.

In some embodiments, semiconductor layers 114 may include silicon (such as single crystal, amorphous or polycrystalline silicon), and the top cladding layer (not shown) may include a dielectric (such as silicon dioxide) or air. For example, semiconductor layer 114-2 may include polished silicon. Furthermore, semiconductor layer 114-1 may be disposed on a buried-oxide (BOX) layer 112, and BOX layer 112 may be disposed on substrate 110. In an exemplary embodiment, substrate 110 includes silicon, and BOX layer 112 includes a dielectric or an oxide (such as silicon dioxide). Therefore, substrate 110, BOX layer 112 and semiconductor layer 114-1 may constitute a silicon-on-insulator (SOI) technology. Furthermore, the silicon in semiconductor layers 114 may be between 0.2 and 0.5 µm thick, and the silicon-dioxide layer may have a thickness between 0.001 and 10 µm.

Using this configuration, thickness 122 can be controlled accurately and uniformly using a variety of fabrication techniques, including: thermal deposition, sputtering deposition, and/or spin-on techniques. Note that after deposition, the electro-optic material can be removed from regions outside of width 120 using lithographic techniques and/or polishing.

Figure 3:
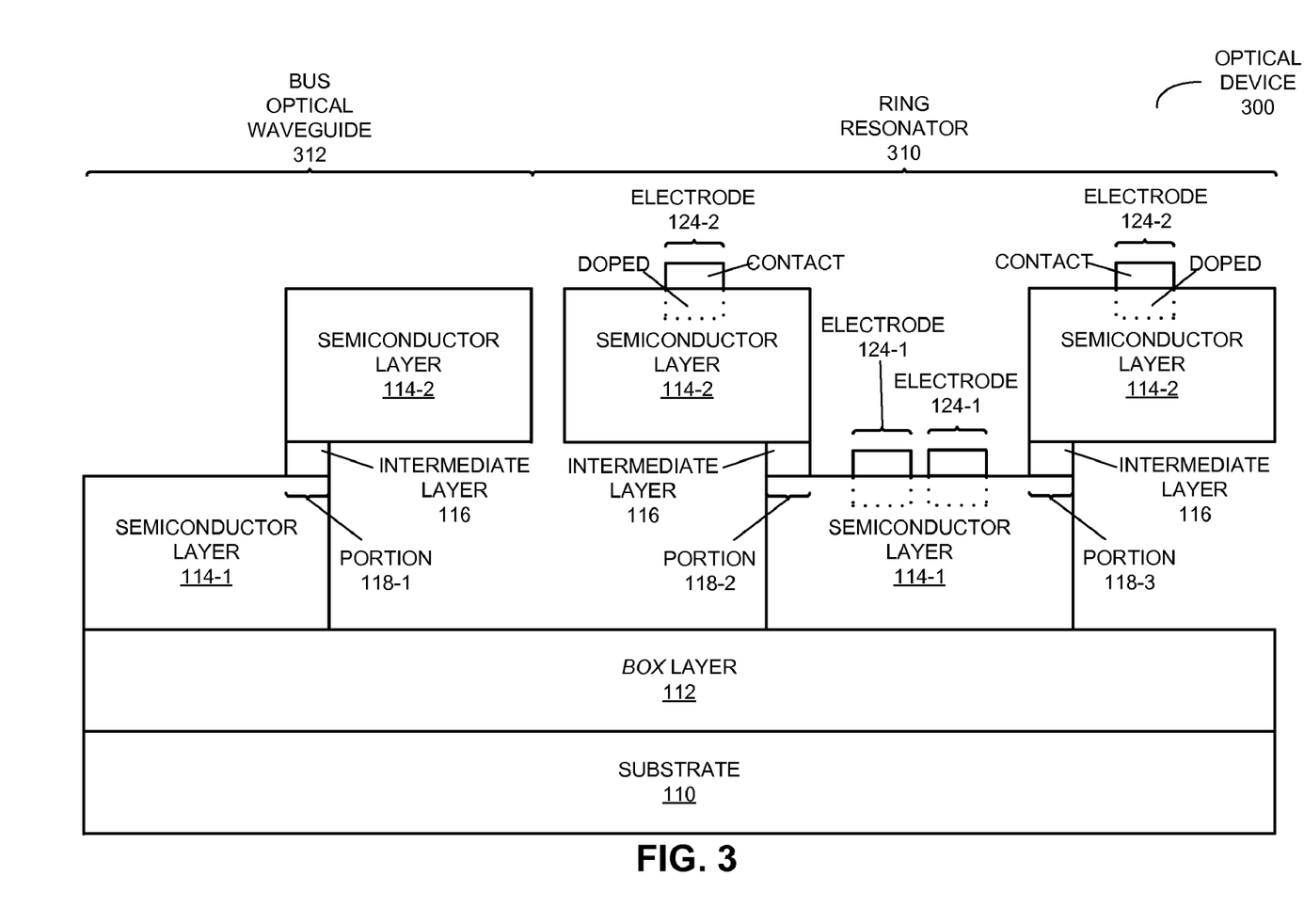
FIG. 3 is a block diagram illustrating a cross-sectional view of an optical device that includes the optical waveguide of FIGS. 1 and 2 in accordance with an embodiment of the present disclosure.
Figure 4:
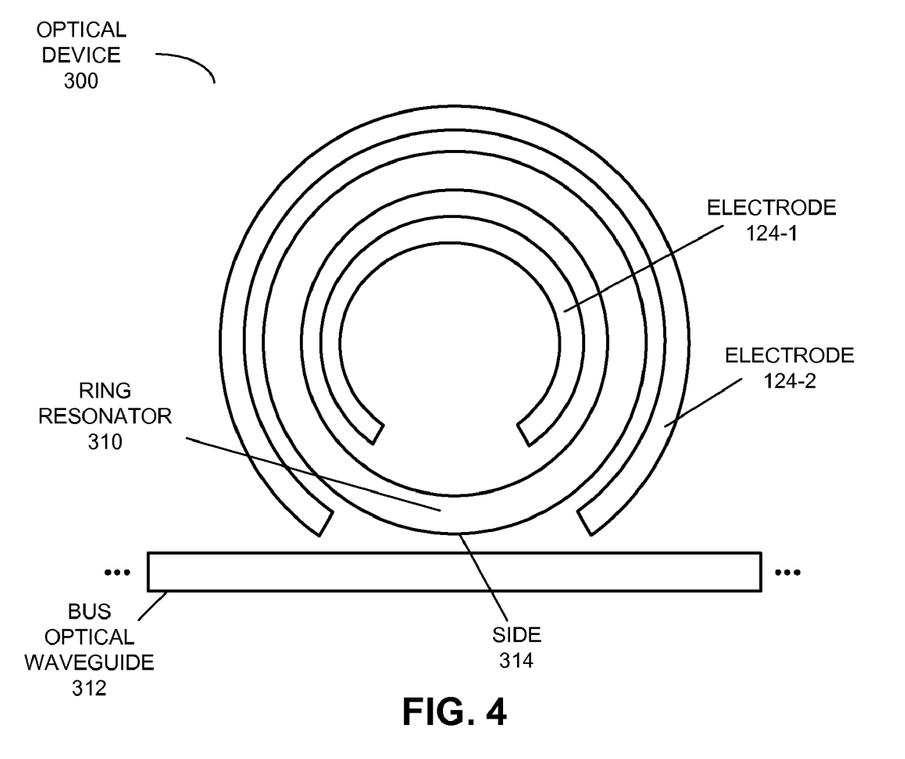
FIG. 4 is a block diagram illustrating a top view of the optical device of FIG. 3 in accordance with an embodiment of the present disclosure.

Optical waveguide 100 may be included in an optical modulator. This is shown in FIGS. 3 and 4, which, respectively, present block diagrams illustrating a cross-sectional view and a top view of an optical device 300 that includes the horizontal-slot configuration of optical waveguide 100 (FIGS. 1 and 2) in a resonator-type optical modulator. In this optical device, electrodes 124 facilitate electro-optic modulation of the index of refraction of ring resonator 310 without adversely impacting its quality (Q) factor. For example, electrode 124-1 may surround a majority of an inner circumference of ring resonator 310 and electrode 124-2 may surround a majority of an outer circumference of ring resonator 310. Additionally, optical device 300 may include a bus optical waveguide 312 that is proximate to a side 314 of ring resonator 310, and electrodes 124 may be excluded from the inner circumference and the outer circumference proximate to side 314, thereby avoiding an adverse impact on optical coupling between ring resonator 310 and bus optical waveguide 312.

The resonator-type optical modulator in FIGS. 3 and 4 (as well as that described below in FIGS. 5 and 6) can have: low capacitance (and a high data rate), a high ON/OFF extinction ratio (greater than 10 dB), a low optical loss (less than 2 dB), a low driving or modulation voltage (around 1 V), and approximately zero power consumption during tuning because thermal tuning or electrical tuning may not be needed. This optical modulator can also reduce the optical mode shifting toward the outer edge of ring resonator 310, and can maintain a good overlap between the optical mode and the horizontal slot because the optical field intensity is largely confined to the horizontal slot, which enables a compact ring resonator (for example, ring resonator 310 can have a radius as small as 10 µm). Therefore, optical device 300 may have a small footprint or size.

While the preceding embodiments of the optical waveguide included a horizontal slot, in other embodiments a vertical slot is used. In particular, a narrow vertical slot approximately in the middle of the waveguide core allows the optical mode to be confined around the waveguide core, and results in a large portion of the optical mode inside the vertical slot. This vertical slot is filled with the electro-optic material.

Figure 5:
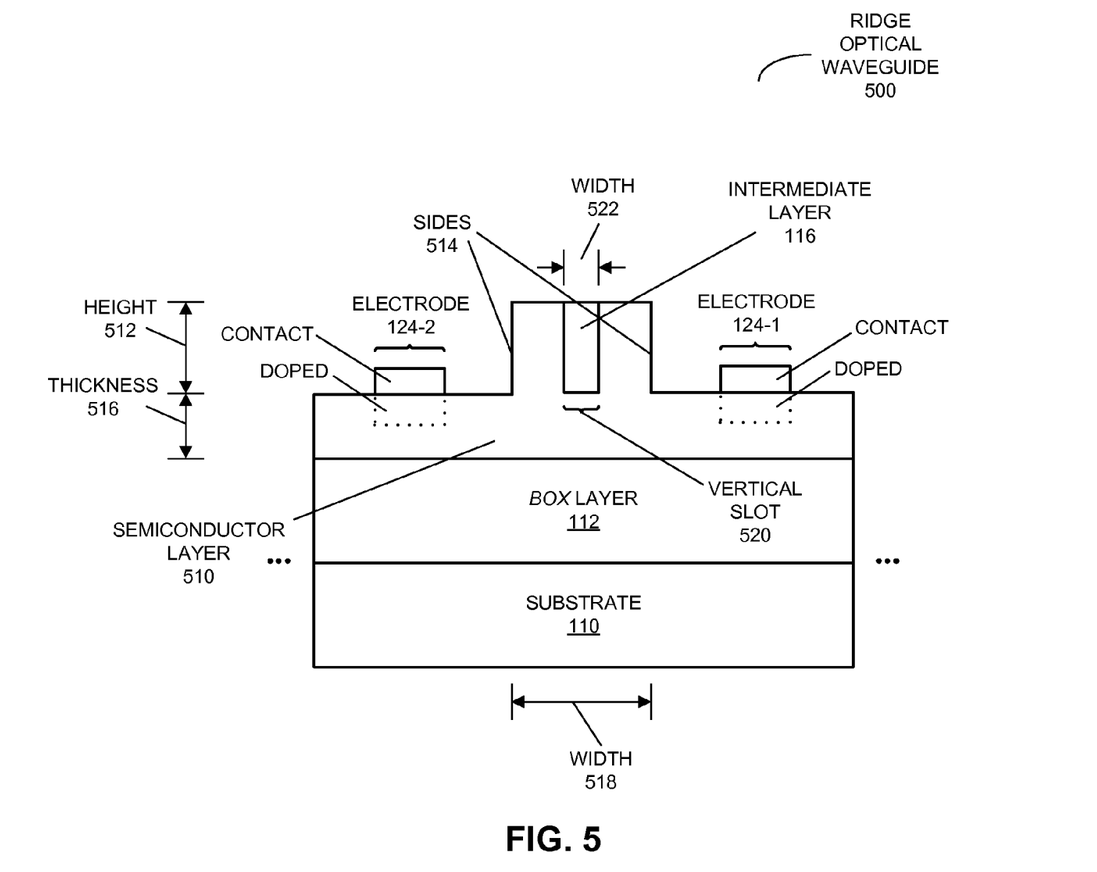
FIG. 5 is a block diagram illustrating a cross-sectional view of a ridge optical waveguide in accordance with an embodiment of the present disclosure.
Figure 6:
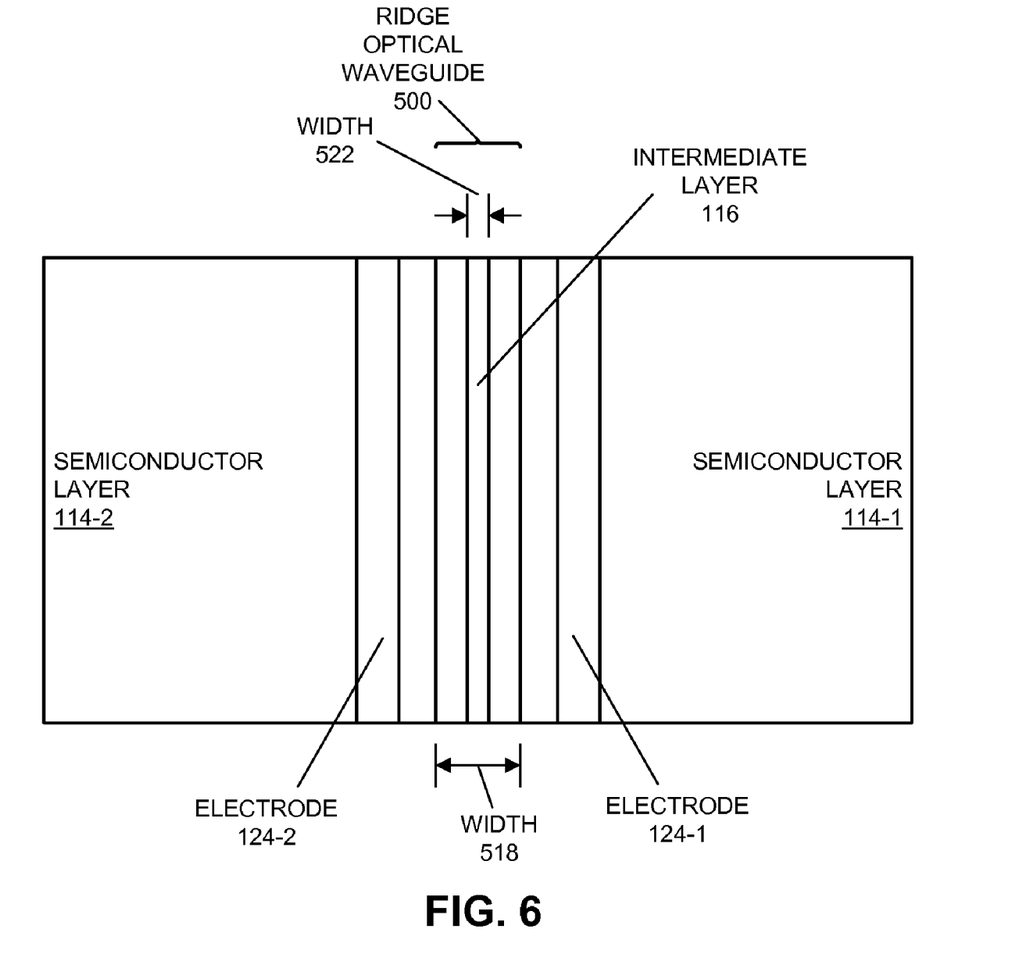
FIG. 6 is a block diagram illustrating a top view of the ridge optical waveguide of FIG. 5 in accordance with an embodiment of the present disclosure.

FIGS. 5 and 6, respectively, present block diagrams illustrating a cross-sectional view and a top view of a rib or ridge optical waveguide 500, which may be included in an integrated circuit. This ridge optical waveguide is defined in semiconductor layer 510, and has a height 512 and a width 518. For example, height 512 may be between 0.2 and 0.5 μm, and width 518 may be between 0.2 and 0.5 μm. Note that height 512 may exceed a thickness 516 of semiconductor layer 510 adjacent and proximate to ridge optical waveguide 500. Furthermore, ridge optical waveguide 500 includes a vertical slot 520 approximately in the middle of width 518 and extending over height 512. This vertical slot may have a width 522 between 100 and 500 nm, and there may be 100-200 nm of optical waveguide on either side of vertical slot 520.

Note that the electro-optic material may be disposed in vertical slot 520. This electro-optic material differs from a semiconductor in semiconductor layer 510. In order to uniformly fill vertical slot 520 with the electro-optic material, its viscosity may be adjusted (such as during a spin-on technique). In addition, in some embodiments filling may be assisted using: vacuum (to pull the electro-optic material into vertical slot 520), a surfactant and/or a de-surfactant. Note that excess electro-optic material can be removed from other areas using lithography or polishing.

Modulation bias can be applied to optical waveguide 500 using electrodes 124 that are defined by doping semiconductor layer 510 (or by using another high index of refraction conductive material) adjacent and proximate to corresponding sides 514 of ridge optical waveguide 500, thereby facilitating electro-optic modulation of the index of refraction in ridge optical waveguide 500. For example, electrodes 124 may be 2 μm away from sides 514, thereby avoiding additional optical loss associated with heavily doped electrodes 124. In addition, thickness 516 of semiconductor layer 510 adjacent and proximate to optical waveguide 500 may provide a conductive bridge between electrodes 124 and optical waveguide 500. This thickness may be less than 100 nm.

Figure 7:
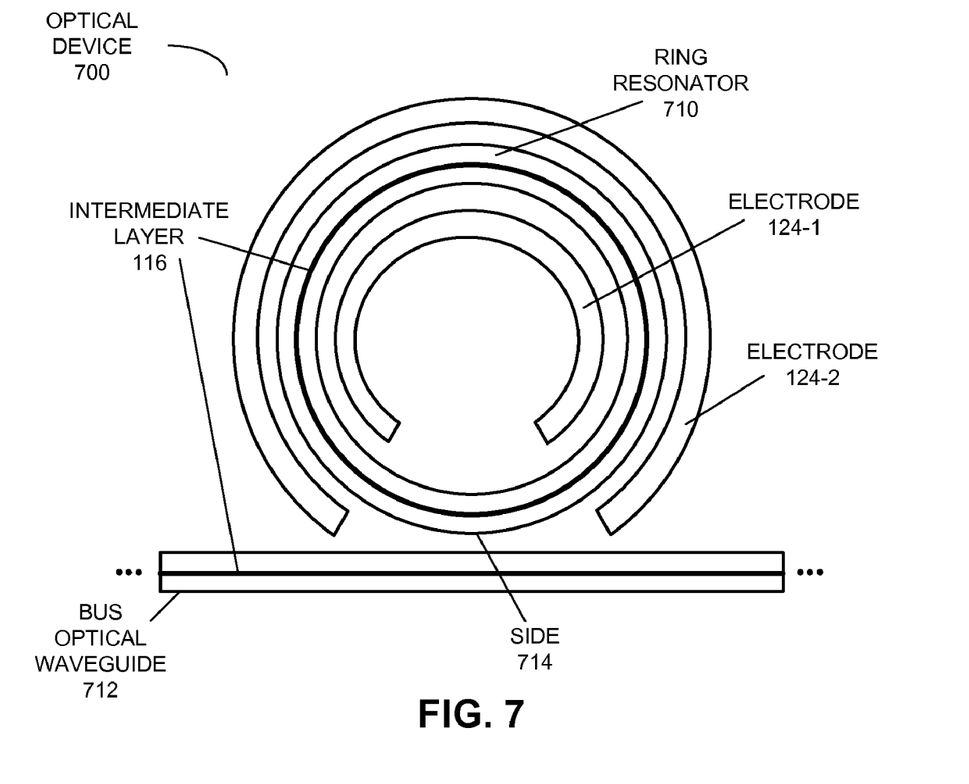
FIG. 7 is a block diagram illustrating a top view of an optical device that includes the ridge optical waveguide of FIGS. 5 and 6 in accordance with an embodiment of the present disclosure.

Optical waveguide 500 may be included in an optical modulator. This is shown in FIG. 7, which presents a block diagram illustrating a top view of an optical device 700 that includes the vertical-slot configuration of a ridge optical waveguide 500 (FIGS. 5 and 6) in a resonator-type optical modulator. In this optical device, electrodes 124 facilitate electro-optic modulation of the index of refraction of ring resonator 710 without adversely impacting its Q factor. For example, electrode 124-1 may surround a majority of an inner circumference of ring resonator 710, and electrode 124-2 may surround a majority of an outer circumference of ring resonator 710. Additionally, optical device 700 may include a bus optical waveguide 712 that is proximate to a side 714 of ring resonator 710, and electrodes 124 may be excluded from the inner circumference and the outer circumference proximate to side 714, thereby avoiding an adverse impact on optical coupling between ring resonator 710 and bus optical waveguide 712. In an exemplary embodiment, electrodes 124 surround 60% of ring resonator 710.

Figure 8:
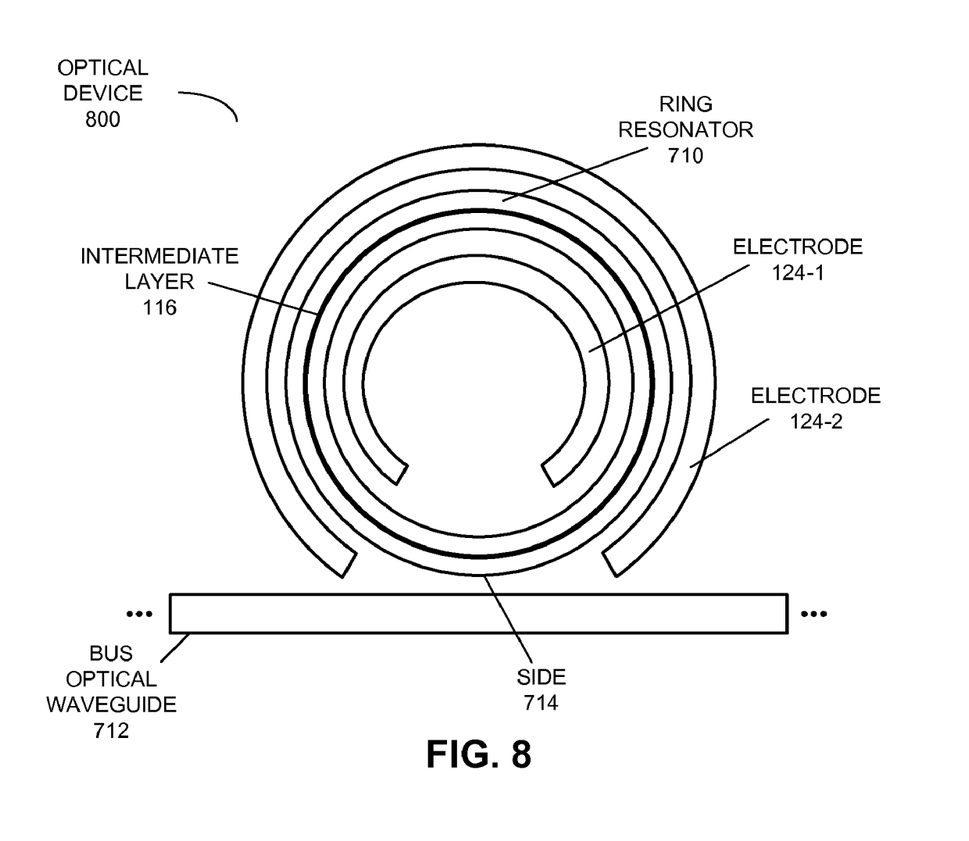
FIG. 8 is a block diagram illustrating a top view of an optical device that includes the ridge optical waveguide of FIGS. 5 and 6 in accordance with an embodiment of the present disclosure.

While FIG. 7 illustrates the optical modulator with vertical slots in both ring resonator 710 and bus optical waveguide 712, in other embodiments only ring resonator 710 includes the vertical slot with the electro-optic material. This is shown in FIG. 8, which presents a block diagram illustrating a top view of an optical device 800 that includes ridge optical waveguide 500 (FIGS. 5 and 6).

Figure 9:
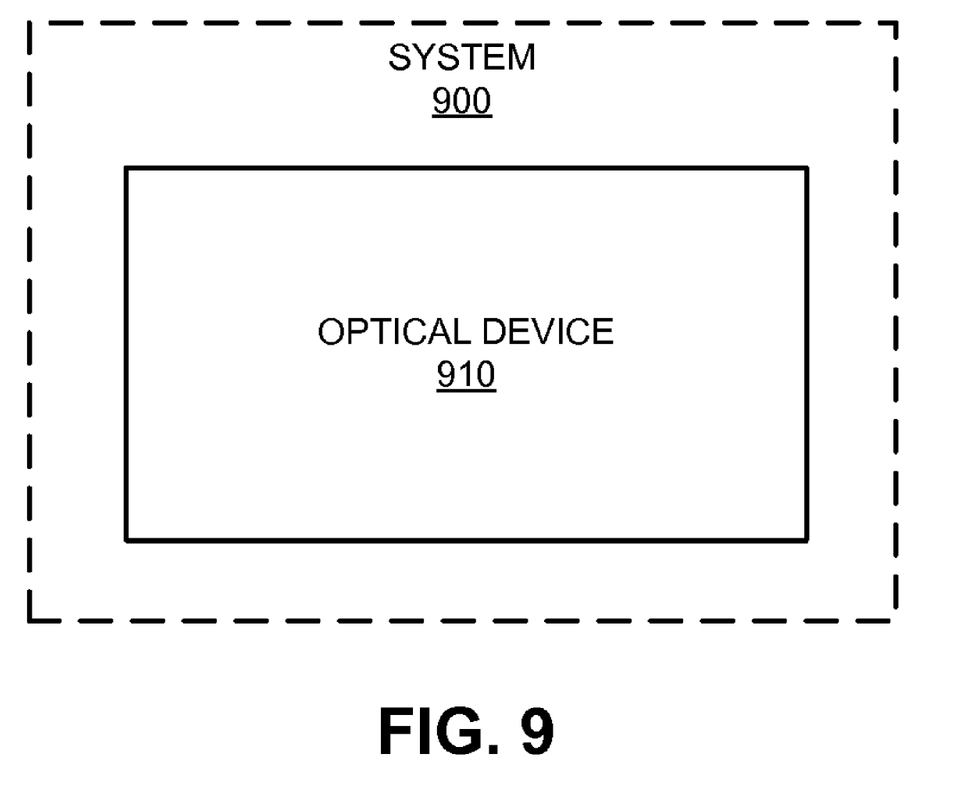
FIG. 9 is a block diagram illustrating a system that includes an optical device in accordance with an embodiment of the present disclosure.

One or more of the preceding embodiments of the optical waveguide and/or the optical device may be included in a system and/or an electronic device. This is shown in FIG. 9, which presents a block diagram illustrating a system 900 that includes optical device 910.

In some embodiments, one or more of these optical devices may be included in a multi-chip module (MCM) (such as a switch or a processor) and/or in a system that include the MCM. This MCM may include an array of chip modules (CMs) or single-chip modules (SCMs), and a given SCM may include at least one semiconductor die or substrate. Note that the MCM is sometimes referred to as a 'macro-chip.' Furthermore, the semiconductor die may communicate with other semiconductor dies, CMs, SCMs, and/or devices in the MCM using proximity communication of electromagnetically coupled signals (which is referred to as 'electromagnetic proximity communication'), such as capacitively coupled signals and/or proximity communication of optical signals (which are, respectively, referred to as 'electrical proximity communication' and 'optical proximity communication'). In some embodiments, the electromagnetic proximity communication includes inductively coupled signals and/or conductively coupled signals.

Furthermore, embodiments of the optical waveguide and/or the optical device may be used in a variety of applications, including: VLSI circuits, communication systems (such as in wavelength division multiplexing), an optical link, an inter-chip or an intra-chip optical interconnect, storage area networks, data centers, networks (such as local area networks), and/or computer systems (such as multiple-core processor computer systems). For example, the optical device may be included in a backplane that is coupled to multiple processor blades, or the optical device may couple different types of components (such as processors, memory, input/output devices, and/or peripheral devices). In some embodiments, the optical device performs the functions of: a switch, a hub, a bridge, and/or a router.

Additionally, embodiments of the optical waveguide and/or the optical device may be used in bio-related, light-emitting and/or -sensing applications. For example, a trace change in the electro-optic material inside the horizontal or vertical slot (which results in a trace change of the index of refraction) may be detected based on the change in the resonant characteristics of an optical modulator (such as the resonant wavelength and/or the transmittance shape).

Note that system 900 may include, but is not limited to: a server, a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Furthermore, note that a given computer system may be at one location or may be distributed over multiple, geographically dispersed locations.

The optical waveguides and optical devices in the preceding embodiments, as well as system 900 in FIG. 9, may include fewer components or additional components. For example, semiconductor layer(s) 114 may include poly-silicon or amorphous silicon. Note that the optical waveguide may be included in a variety of optical devices or components, such as: an optical modulator, an optical filter, an optical multiplexer, an optical de-multiplexer and an add/drop device. In addition, embodiments of the optical waveguide may be used in other types of optical modulators, such as: MZI modulators and/or micro-disk modulators.

Note that a wide variety of fabrication techniques may be used to fabricate the optical waveguides and the optical devices in the preceding embodiments, as known to one of skill in the art.

Although these embodiments are illustrated as having a number of discrete items, the embodiments of the optical waveguide, the optical device and the system are intended to be functional descriptions of the various features that may be present rather than structural schematics of the embodiments described herein. Consequently, in these embodiments two or more components may be combined into a single component, and/or a position of one or more components may be changed.

Figure 10:
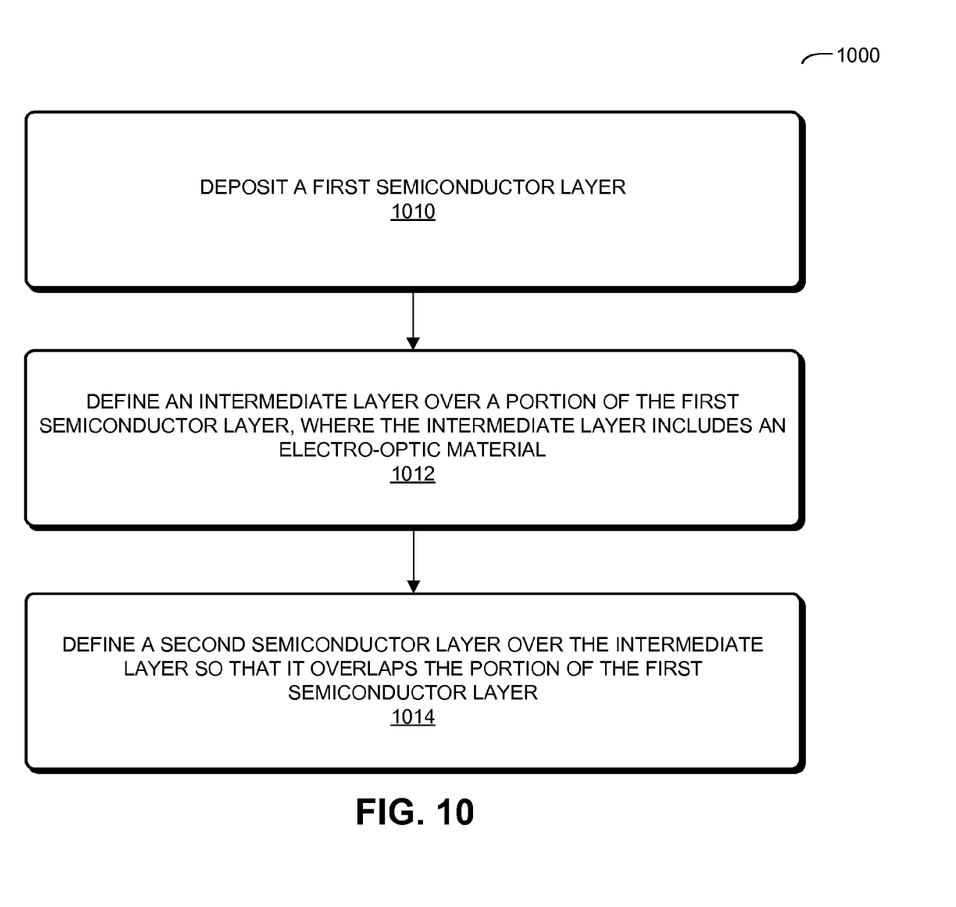
FIG. 10 is a flow chart illustrating a process for fabricating an optical waveguide in accordance with an embodiment of the present disclosure.

We now describe embodiments of a process. FIG. 10 presents a flow chart illustrating a process 1000 for fabricating an optical waveguide. During this process, a first semiconductor layer is deposited (operation 1010). Then, an intermediate layer is defined over a portion of the first semiconductor layer (operation 1012), where the intermediate layer includes an electro-optic material having an electric-field-dependent index of refraction, and the electro-optic material differs from a semiconductor in the first semiconductor layer. Next, a second semiconductor layer is defined over the intermediate layer so that it substantially overlaps the portion of the first semiconductor layer (operation 1014).

Figure 11:
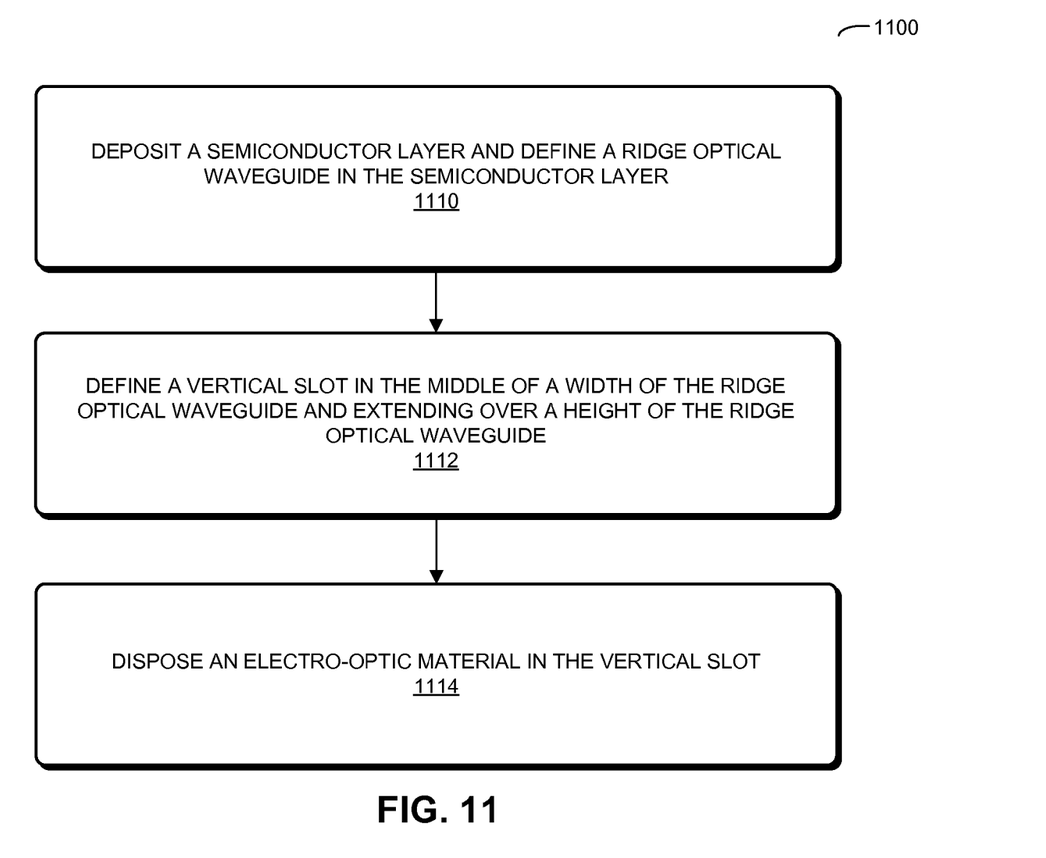
FIG. 11 is a flow chart illustrating a process for fabricating a ridge optical waveguide in accordance with an embodiment of the present disclosure.

FIG. 11 presents a flow chart illustrating a process 1100 for fabricating a ridge optical waveguide. During this process, a semiconductor layer is deposited, and the ridge optical waveguide is defined in the semiconductor layer (operation 1110). Then, a vertical slot, which is approximately in the middle of a width of the ridge optical waveguide and which extends over a height of the ridge optical waveguide, is defined (operation 1112). Next, an electro-optic material, which has the electric-field-dependent index of refraction, and which differs from a semiconductor in the semiconductor layer, is disposed in the vertical slot (operation 1114).

In some embodiments of process 1000 and 1100, there may be additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising an optical waveguide, wherein the optical waveguide includes:
   a ring resonator, comprising:
      a first semiconductor layer;
      an intermediate layer disposed over a portion of the first semiconductor layer, wherein the intermediate layer includes an electro-optic material having an electric-field-dependent index of refraction, and wherein the electro-optic material differs from a semiconductor in the first semiconductor layer, the intermediate layer formed into a circle having a circumference;
      a second semiconductor layer disposed over the intermediate layer and substantially overlapping the portion of the first semiconductor layer;
      a first electrode on the first semiconductor layer, wherein the first electrode is located beside a majority of an inner circumference of the intermediate layer of the ring resonator; and
      a second electrode on the second semiconductor layer, wherein the second electrode is located beside a majority of an outer circumference of the intermediate layer of the ring resonator.

2. The integrated circuit of claim 1, wherein the intermediate layer has a width, thereby defining a width of the optical waveguide.

3. The integrated circuit of claim 1, further comprising a bus optical waveguide proximate to a side of the ring resonator, wherein the first electrode and the second electrode are excluded from the inner circumference and the outer circumference proximate to the side, thereby avoiding an adverse impact on optical coupling between the ring resonator and the bus optical waveguide.

4. The integrated circuit of claim 1, wherein the electro-optic material includes one of an electro-optic polymer and a ferroelectric material.

5. The integrated circuit of claim 1, wherein the first semiconductor layer and the second semiconductor layer include silicon.

6. The integrated circuit of claim 1, further comprising:
   a substrate; and
   a buried-oxide layer disposed on the substrate, wherein the semiconductor layer is disposed on the buried-oxide layer.

7. The integrated circuit of claim 6, wherein the substrate, the buried-oxide layer and the semiconductor layer comprise a silicon-on-insulator technology.

8. A method for fabricating an optical waveguide, comprising:
   fabricating a ring resonator by:
      fabricating a first semiconductor layer;
      depositing an intermediate layer disposed over a portion of the first semiconductor layer, wherein the intermediate layer includes an electro-optic material having an electric-field-dependent index of refraction, and wherein the electro-optic material differs from a semiconductor in the first semiconductor layer, the intermediate layer formed into a circle having a circumference;
      depositing a second semiconductor layer disposed over the intermediate layer and substantially overlapping the portion of the first semiconductor layer;
      fabricating a first electrode on the first semiconductor layer, wherein the first electrode is located beside a majority of an inner circumference of the intermediate layer of the ring resonator; and
      fabricating a second electrode on the second semiconductor layer, wherein the second electrode is located beside majority of an outer circumference of the intermediate layer of the ring resonator.

9. An integrated circuit, comprising:
   a ring resonator, comprising:
      a ridge optical waveguide, having a height and a width, defined in a semiconductor layer, wherein the height exceeds a thickness of the semiconductor layer adjacent and proximate to the ridge optical waveguide, and wherein the ridge optical waveguide includes a vertical slot approximately in the middle of the width and extending over the height, wherein the ridge optical waveguide is formed into a circle having a circumference;

an electro-optic material, disposed in the vertical slot, having an electric-field-dependent index of refraction, wherein the electro-optic material differs from a semiconductor in the semiconductor layer; and a first electrode and a second electrode on the semiconductor layer adjacent and proximate to a corresponding first side and a second side of the ridge optical waveguide, wherein the first electrode is located beside a majority of an inner circumference of the ridge optical waveguide and the second electrode is located beside a majority of an outer circumference of ridge optical waveguide.

10. The integrated circuit of claim 9, further comprising a bus ridge waveguide proximate to a side of the ring resonator, wherein the first electrode and the second electrode are excluded from the inner circumference and the outer circumference proximate to the side, thereby avoiding an adverse impact on optical coupling between the ring resonator and the bus ridge waveguide.

11. The integrated circuit of claim 9, wherein the electro-optic material includes one of an electro-optic polymer and a ferroelectric material.

12. The integrated circuit of claim 9, wherein the semiconductor layer includes silicon.

13. The integrated circuit of claim 9, further comprising:
a substrate; and
a buried-oxide layer disposed on the substrate, wherein the semiconductor layer is disposed on the buried-oxide layer.

14. The integrated circuit of claim 13, wherein the substrate, the buried-oxide layer and the semiconductor layer comprise a silicon-on-insulator technology.

* * * * *